United States Patent [19]

Fleischmann et al.

[11] Patent Number: 5,003,015

[45] Date of Patent: Mar. 26, 1991

[54] PROCESS FOR THE POLYMERIZATION OF POLAR COMPOUNDS

[75] Inventors: Gerald Fleischmann; Herbert Eck, both of Burghausen, Fed. Rep. of Germany

[73] Assignee: Wacker-Chemie GmbH, Munich, Fed. Rep. of Germany

[21] Appl. No.: 463,711

[22] Filed: Jan. 11, 1990

[30] Foreign Application Priority Data

Feb. 2, 1989 [DE] Fed. Rep. of Germany ....... 3903145

[51] Int. Cl.$^5$ ................................................ C08F 4/72
[52] U.S. Cl. .................................... 526/183; 526/190
[58] Field of Search ................ 526/183, 190, 240, 279

[56] References Cited

U.S. PATENT DOCUMENTS 4,417,034 11/1983 Webster .............................. 526/190

Primary Examiner—Joseph L. Schofer
Assistant Examiner—R. H. Delmendo

[57] ABSTRACT

The invention relates to an improved process for the polymerization of polar compounds which have a C=C double bond in the α-position to a carbonyl, nitrile, sulfone, phosphone or nitro group, such as, for example, acrylic acid derivatives, α-nitroolefins, vinyl sulfone derivatives and vinyl phosphonic acid esters. The quasi-ionic polymerization is initiated by organometallic compounds of silicon, germanium and tin as initiators together with nucleophilic or electrophilic catalysts, and is carried out at temperatures in the range of from −100° C. to +100° C., in which the initiators are selected from silanes, germanes, stannanes, siloxanes, germoxanes or stannoxanes having at least one metal-bonded allyl or propargyl group, which may be substituted by hydrocarbon groups, per metal atom.

6 Claims, No Drawings

PROCESS FOR THE POLYMERIZATION OF POLAR COMPOUNDS

The invention relates to an improved process for the polymerization of polar compounds which have a C=C double bond in the α-position to a carbonyl, nitrile, nitro, sulfone or phosphone group. More particularly the improved process relates to the polymerization of acrylic acid derivatives, such as esters, nitriles and amides of acrylic acid and methacrylic acid, α-nitroolefins, vinylsulfonic acid derivatives and vinylphosphonic acid derivatives.

BACKGROUND OF THE INVENTION

Polymeric acrylic acid derivatives are usually prepared commercially by free-radical polymerization initiated by initiators which form free radicals and the chain is terminated when two of the free radicals formed react with one another. In this process, polymers having a high molecular weight but a very broad molecular weight distribution can be obtained.

Anionic polymerization of acrylic acid derivatives is also known which is not initiated by free radicals but instead by initiators which form anions, such as organoalkali metal compounds. This type of polymerization forms so-called "living polymers" which have active terminal groups since chain termination by reaction of two ions of the same charge is not possible. The chain termination can be affected artificially, for example, by adding water or alcohol. This process has certain disadvantages since the narrow molecular weight distribution which is desired can only be achieved at low temperatures, for example, up to −80°C., and using very pure starting materials (cf. U.S. Pat. No. 4,351,924 to Andrews et al).

The polymerization of acrylic acid derivatives which has become known under the term "quasi-ionic" polymerization has a similar basis. In this process, the initial reaction is initiated by certain selected initiators together with nucleophilic or electrophilic catalysts to form living polymers. Selected initiators are known compounds of silicon, germanium and tin in which the elements mentioned are bonded to oxygen or carbon atoms, such as trimethylsilylketene acetals or trimethylsilyl cyanide (cf. U.S. Pat. No. 4,414,372 to Farnham et al; U.S. Pat. No. 4,417,034 to Webster; U.S. Pat. No. 4,508,880 to Webster; U.S. Pat. No. 4,524,196 to Farnham et al; U.S. Pat. No. 5 4,588,795 to Dicker et al; and U.S. Pat. No. 4,732,955 to Dicker). This process can be carried out at room temperature and above, but again requires starting materials of high purity, and in addition, only forms polymers having a narrow molecular weight distribution if methacrylic acid derivatives are used.

Initiators of the mercaptosilane type give living polymers having a narrow molecular weight distribution under the quasi-ionic polymerization conditions, even when acrylic acid derivatives are used as monomers (cf. U.S. Pat. No. 4,626,579 to Reetz et al).

According to the prior art, polymers having a narrow molecular weight distribution, but with mean molecular weights themselves which are generally relatively low, are obtained from monomeric acrylic acid derivatives of any type with the aid of quasi-ionic polymerization using certain organosilicon compounds as initiators in combination with nucleophilic or electrophilic catalysts.

Therefore, it is an object of the present invention to provide an improved process for the polymerization of polar compounds which have a C=C double bond in the α-position to a carbonyl, nitrile, nitro, sulfone or phosphone group. Another object of the present invention is to provide an improved process for the polymerization of polar compounds having a C=C double bond in which the polymerization is initiated by organometallic compounds as initiators together with nucleophilic or electrophilic catalysts at a temperature of from about −100°C. to +100°C. A further object of the present invention is to provide an improved process for the polymerization of polar compounds other than acrylic acid derivatives which yields polymers having both a high mean molecular weight and also a narrow molecular weight distribution.

SUMMARY OF THE INVENTION

The foregoing objects and others which will become apparent from the following description are accomplished in accordance with this invention, generally speaking, by providing an improved process for the polymerization of polar compounds having a C=C double bond in the α-position to a carbonyl, nitrile, nitro, sulfone or phosphone group, in which the polymerization is initiated by organometallic compounds of silicon, germanium and tin, together with nucleophilic or electrophilic catalysts at temperatures in the range of from −100°C. to +100°C., the improvement which comprises conducting the polymerization in the presence of organometallic compounds as initiators, in which the organometallic compounds are selected from the group consisting of silanes, germanes, stannanes, siloxanes, germoxanes and stannoxanes which contain at least one Si-, Ge- or Sn-bonded 2-alkenyl and/or 2-alkynyl group per molecule. These groups may be substituted by organic radicals free of protic H atoms.

DESCRIPTION OF THE INVENTION

The improved process of this invention may be employed in the polymerization of polar compounds having a C=C double bond in the α-position to a carbonyl, nitrile, nitro, sulfone or phosphone group. These polar compounds include acrylic acid derivatives such as esters, nitriles, and amides of acrylic acid and methacrylic acid, α-nitroolefins, vinylsulfonic acid derivatives and vinylphosphonic acid derivatives.

The silane, germane and stannane organometallic compounds used as initiators may be represented by the general formula

in which Me represents Si, Ge or Sn; R represents an alkyl, cycloalkyl, aryl, aralkyl or alkenyl radicals; X represents radicals of the formulas

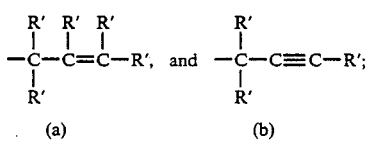

R' represents H atoms or radicals represented by R, and n is 1, 2, 3 or 4.

Preferred siloxanes, germoxanes and stannoxanes are chain or ring form compounds which contain at least one unit of the general formula

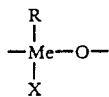

(2)

in which Me, R and X are the same as above and the remaining valences of the metal atoms are saturated by radicals represented by R or are bonded to O atoms of units (2) or units of the general formula

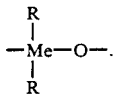

(2')

Examples of radicals represented by R in these organometallic compounds used in this invention, which may be the same or different, are alkyl radicals having from 1 to 18 carbon atoms, preferably from 1 to 4 carbon atoms, which may be straight-chain or branched, such as methyl, ethyl, n-propyl, iso-propyl and n-butyl radicals; cycloalkyl radicals, such as cyclopentyl and cyclohexyl radicals; alkenyl radicals having 2 to 18 carbon atoms whose C=C double bond must not be in the 2-position counting from the metal atom, preferably having from 2 to 4 carbon atoms, such as vinyl, 1-propenyl and 3-butenyl radials; aryl radicals, such as phenyl, tolyl, xylyl and naphthyl radicals, and aralkyl radicals whose aryl group must not be on the carbon atoms in the 1-position counting from the metal atom, such as 2-phenylethyl and 3phenylpropyl radicals. For reasons of easy availability, ethyl, vinyl, phenyl, and in particular, methyl radicals are particularly preferred.

Preferred radicals represented by X are, in particular, allyl radicals conforming to the formula (Ia) and propargyl radicals conforming to the formula (Ib), which may also be substituted by radicals represented by R, or which can form a ring together with the latter or with inclusion of the metal atom. Examples of such radicals other than the ally and propargyl radicals in which the radicals represented by R' are in each case hydrogen atoms, are methallyl, but-3-en-2-yl, 3-methyl-2-butenyl (prenyl), 2-butynl, 2-cyclohexenyl, 2-cyclopentenyl and 1-sila-3-cyclopentenyl radicals.

The organometallic compounds used according to this invention as initiators are either commercially available products or can be prepared in a manner known per se.

To carry out the polymerization process, the organometallic compounds used according to this invention are employed together with nucleophilic or electrophilic catalysts. Catalysts of this type are known and described, for example, in U.S. Pat. No. 4,417,034 to Webster. Tetrabutylammonium fluoride and tetrabutylammonium cyanide are particularly preferred.

The initiator to catalyst molar ratio is usually in the range of from 1,000 to 0.1:1, preferably in the range of from 100 to 1:1, and more preferably in the range of from 50 to 10:1.

The polymerization process itself can be carried out, depending on the initiator selected, at temperatures in the range of from $-100°C.$ to $+100°C.$, preferably in the range of from $-20°C.$ to $+60°C.$, and more preferably in the range of from $+10°C.$ to $+50.C$. It is essential that the process be carried out in the absence of moisture, which can usually be achieved with the aid of an inert-gas atmosphere, such as argon or nitrogen, or using dry air. The polymerization can be carried out batchwise or continuously with or without an aprotic solvent as a solution, precipitation, suspension or emulsion polymerization. Solvents advantageously employed are those in which the monomers employed and the initiator and catalyst are adequately soluble at the reaction temperature employed. Examples of aprotic solvents which may be employed are methyl acetate, ethyl acetate, butyl acetate, acetonitrile, toluene, xylene, N,N-dimethylformamide, N-methylpyrrolidone, tetrahydrofuran, tert-butyl methyl ether and silicone oils, such as, for example, polydimethylsiloxane oils and polymethylphenylsiloxane oils having viscosities in the range of from about 5 to 500 mPa.s at 25°C.

Examples of suitable monomers to be polymerized are, in particular, acrylic acid derivatives of any type, such as esters, amides and nitriles of acrylic acid and methacrylic acid. Further examples of these are, in particular, acrylic acid esters, such as n-butyl acrylate, ethyl acrylate and 2-ethylhexyl acrylate; methacrylic acid esters, such as methyl methacrylate, ethyl methacrylate, n-bytyl methacrylate, cyclohexyl methacrylate, dodecyl methacrylate and tetradecyl methacrylate. Other monomers such as, $\alpha$-nitroolefins, such as nitroethene, 2-nitro-1-propene, 1-nitro-1-cyclohexene; vinyl sulfone derivatives, such as vinyl methyl sulfone, vinyl phenyl sulfone, ethyl vinylsulfonate; and vinylphosphonic acid esters, such as diethyl vinylphosphonate may be employed.

The polymerization process can be carried out batchwise or continuously in a manner known per se.

Initiator and catalyst are advantageously initially introduced and the monomers are metered in with or without solvents with mechanical agitation to provide good distribution of the monomers and with cooling in order to maintain the intended temperature of the exothermic reaction. When the added monomers have been consumed, the polymerization is finished. However, living polymers which are still active even after consumption of the monomers are still present in the reaction vessel. These polymers can be polymerized further in a known manner by adding other monomers to form block copolymers or they can be converted into inactive polymers by adding chain terminators or so-called coupling agents, such as described in, for example, U.S. Pat. No. 4,417,034 to Webster.

When the initiators of this invention are used, it is possible to quasi-ionically polymerize acrylic acid derivatives of any type in a broad temperature range, and to obtain polymers which have a narrow molecular weight distribution.

The invention is described in greater detail in the following examples, in which the polymerization reactions were in each case carried out under argon as an inert gas atmosphere or dry air, unless otherwise specified. The solvents used were dried by known methods, and the monomers were purified by filtration over aluminum oxide. The anhydrous solution of tetrabutylammonium fluoride in tetrahydrofuran or toluene was prepared in a known manner using calcium hydride. The polymeric end products were characterized by NMR spectroscopy ($^1$H NMR) and by gel chromatography (GPC). The silanes were employed in their commercial forms without further purification. The mean molecular weight $M_n$ in each case was determined by GPC and NMR (end group determination).

EXAMPLE 1

About 64 g (500 mmol) of n-butyl acrylate were added over a period of about 30 minutes into a solution containing 650 mg (5 mmol) of allyltrimethylsilane and 0.15 mmol (0.6 ml of a 0.25M solution in tetrahydrofuran) of tetrabutylammonium fluoride in 100 ml of anhydrous tert-butyl methyl ether with the reaction temperature increasing to about 40°C. When the exothermic reaction was complete, the mixture was stirred at room temperature for an additional 6 hours. The solvent was then removed in vacuo and the product was dried at 60°C. in a high vacuum.

Yield: 55 g (86 percent theory)
GPC: $M_n$ 12,500; $M_n$ (NMR): 11,000.

EXAMPLE 2

The process of Example 1 was repeated, except that 750 mg (6.7 mmol) of propargyltrimethylsilane was substituted for the allyltrimethylsilane as initiator and 90 g (703 mmol) of n-butyl acrylate was added as monomer.

Yield: 71 g (79 percent of theory)
GPC: $M_n$ 10,000.

EXAMPLE 3

About 100 g (1 mol) of methyl methacrylate were introduced into a solution containing 2.6 g (20 mmol) of allyltrimethylsilane and 1 mol (4 ml of a 0.25M solution in tetrahydrofuran) of tetrabutylammonium fluoride in 10 ml of anhydrous tetrahydrofuran at a rate such that, with stirring and cooling, the reaction temperature did not exceed 40°C. When the exothermic reaction was complete, the mixture was stirred at room temperature for an additional 4 hours. The solvent was then removed in vacuo and the product was dried at 60°C. in a high vacuum.

Yield: 100 g (100 percent of theory)
GPC: $M_n$ 10,000; $M_n$ (NMR): 10,000.

What is claimed is:

1. In an improved process for the polymerization of polar compounds which have a C=C bond in the α-position to a carbonyl, nitrile, nitro, sulfone or phosphone group, in which the polymerization is initiated by organometallic compounds of silicon, germanium and tin as initiators together with nucleophilic or electrophilic catalysts and at temperatures in the range of from −100° C. to +100° C., the improvement which comprises conducting the polymerization in the presence of organometallic compounds as initiators, in which the organometallic compounds are selected from the group consisting of: (a) silanes, germanes and stannanes of the formula

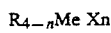

where R is radical selected from the group consisting of alkyl, cycloalkyl, aryl, aralkyl and alkenyl radicals, Me is a metal selected from the group consisting of Si, Ge and Sn and X is a radical selected from the group consisting of

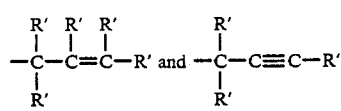

where R' represents R as defined above or hydrogen and n is 1,2,3 or 4; and (b) siloxanes, germoxanes and stannoxanes which contain at least one unit of the general formula

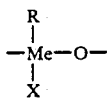

where the remaining valences of the metal atoms are saturated by R radicals or bonded to oxygen atoms of units selected from the group consisting of

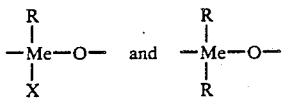

where R, Me and X are as defined above.

2. The improved process of claim 1, wherein the polymerization is conducted in the presence of an aprotic solvent.

3. The improved process of claim 1, wherein the organometallic compound is selected from the group consisting of silanes, germanes and stannes of the general formula $$R_{4-n}MeX_n \quad (1)$$

in which Me is a metal selected from the group consisting of Si, Ge and Sn; R is a radical selected from the group consisting of alkyl, cycloalkyl, aryl, aralkyl and alkenyl radicals, X is a radical selected from the group consisting of the formulas

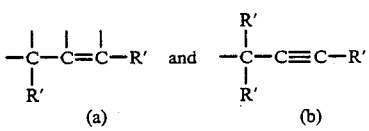

R' is selected from the group consisting of H atoms and R radicals and n is 1, 2, 3 or 4.

4. The improved process of claim 2, wherein the organometallic compound is selected from the group consisting of silanes, germanes and stannanes of the general formula $$R_{4-n}MeX_n \quad (1)$$

in which Me is a metal selected from the group consisting of Si, and Sn; R is a radical selected from the group consisting of alkyl, cycloalkyl, aryl, aralkyl and alkenyl radicals; X is a radical selected from the group consisting of the formulas

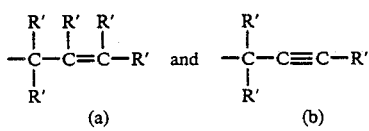

R' is selected from the group consisting of H atoms and R radicals and n is 1, 2, 3, or 4.

5. The improved process of claim 1, wherein the organometallic compound is selected from the group consisting of siloxanes, germoxanes and stannoxanes which are in chain or ring form and which contain at least one unit of the general formula

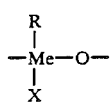 (2)

in which Me is a metal selected from the group consisting of Si, Ge and Sn; R is a radical selected from the group consisting of alkyl, cycloalkyl, aryl, aralkyl and alkenyl radicals; X is a radical selected from the group consisting of the formulas

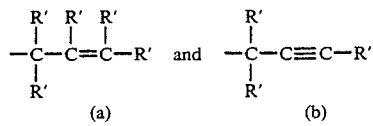

R' is selected from the group consisting of H atoms and R radicals and n is 1, 2, 3 or 4, and the remaining valences of the metal atoms are saturated by R radicals or bonded to O atoms of additional units (2) or units (2') of the general formula

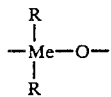 (2')

where R and Me are the same as above.

6. The improved process of claim 2, wherein the organic compound is selected from the group consisting of siloxanes, germoxanes and stannoxanes which are in chain or ring form and which contain at least one unit of the general formula

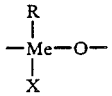 (2)

in which Me is a metal selected from the group consisting of Si, Ge and Sn; R is a radical selected from the group consisting of alkyl, cycloalkyl, aryl, aralkyl and alkenyl radicals; X is a radical selected from the group consisting of the formulas

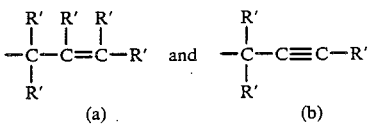

R' is selected from the group consisting of H atoms and R radicals and n is 1, 2, 3 or 4, and the remaining valences of the metal atoms are saturated by R radicals or bonded to O atoms of additional units (2) or units (2') of the general formula

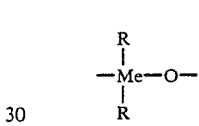 (2')

where R and Me are the same as above.

* * * * *

UNITED STATES PATENT AND TRADEMARK OFFICE
CERTIFICATE OF CORRECTION

PATENT NO. : 5,003,015
DATED : March 26, 1991
INVENTOR(S) : Dr. Gerald Fleischmann and Dr. Herbert Eck It is certified that error appears in the above-identified patent and that said Letters Patent is hereby corrected as shown below:

Claim 3 - Column 6, lines 35 --39, correct formula to read:

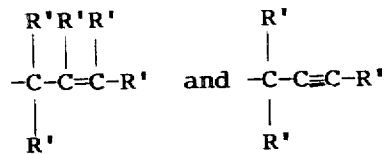

Signed and Sealed this

Twenty-eighth Day of July, 1992

Attest:

DOUGLAS B. COMER

Attesting Officer

Acting Commissioner of Patents and Trademarks